(12) United States Patent
Qidwai et al.

(10) Patent No.: US 7,558,861 B1
(45) Date of Patent: Jul. 7, 2009

(54) SYSTEM AND METHODS FOR CONTROLLING AN APPLICATION

(75) Inventors: Imran H. Qidwai, Westborough, MA (US); John J. Ciarlante, Shrewsbury, MA (US); James B. Holt, II, Needham, MA (US)

(73) Assignee: NMS Communications Corp., Framingham, MA (US)

( * ) Notice: Subject to any disclaimer, the term of this patent is extended or adjusted under 35 U.S.C. 154(b) by 966 days.

(21) Appl. No.: 10/692,464

(22) Filed: Oct. 23, 2003

Related U.S. Application Data

(60) Provisional application No. 60/420,861, filed on Oct. 24, 2002.

(51) Int. Cl.
*G06F 15/16* (2006.01)
*G06F 15/173* (2006.01)
*G06F 7/58* (2006.01)
G06F 3/00 (2006.01)
G06F 9/44 (2006.01)
G06F 9/46 (2006.01)
G06F 13/00 (2006.01)
G06K 19/00 (2006.01)

(52) U.S. Cl. .................. 709/227; 709/201; 709/207; 709/218; 709/219; 709/225; 709/229; 709/230; 709/236; 709/237; 726/3

(58) Field of Classification Search ............... 709/201, 709/207, 217–219, 225, 227–230, 236, 237, 709/248, 249; 719/319; 726/3
See application file for complete search history.

(56) References Cited

U.S. PATENT DOCUMENTS 5,774,695 A * 6/1998 Autrey et al. ................ 703/26
6,263,372 B1 * 7/2001 Hogan et al. ................ 709/237
6,430,602 B1 * 8/2002 Kay et al. .................... 709/206
6,480,894 B1 * 11/2002 Courts et al. ................ 709/227
6,490,624 B1 * 12/2002 Sampson et al. ............ 709/227
6,629,163 B1 * 9/2003 Balassanian ................. 710/33
6,792,605 B1 * 9/2004 Roberts et al. .............. 719/313
6,801,604 B2 * 10/2004 Maes et al. .............. 379/88.17
6,826,613 B1 * 11/2004 Wang et al. ................. 709/227
6,865,681 B2 * 3/2005 Nuutinen ..................... 726/14
6,910,074 B1 * 6/2005 Amin et al. ................. 709/227
6,920,502 B2 * 7/2005 Araujo et al. ............... 709/229

(Continued)

*Primary Examiner*—Larry D Donaghue
*Assistant Examiner*—Melvin H Pollack
(74) *Attorney, Agent, or Firm*—Chapin IP Law, LLC

(57) ABSTRACT

Users of network based software applications typically interact with an application via a command line interface or a menu interface. Conventional voice-driven communication threads rely on a dedicated communication line (connection) to maintain a session context, or state, between a user and an application for the duration of a session. Such state information enables the application to reference a session context for the session duration, and employ the session context to maintain a state from previous atomic messages sent and received between the device and the application. By maintaining and referencing a session context indicative of previous messages, an application identifies an atomic message as corresponding to a particular session context, and employs the session context to process the message within the context, or environment, defined by the previous messages in the session. In this manner, a stateless protocol such as a text messaging protocol is operable to invoke stateful applications from the stateless infrastructure by employing the session context defined by the session of request and response messages.

40 Claims, 8 Drawing Sheets

U.S. PATENT DOCUMENTS

| | | | |
|---|---|---|---|
| 6,993,555 B2 * | 1/2006 | Kay et al. | 709/202 |
| 7,000,019 B2 * | 2/2006 | Low et al. | 709/227 |
| 7,013,329 B1 * | 3/2006 | Paul et al. | 709/217 |
| 7,025,209 B2 * | 4/2006 | Hawkins | 209/217 |
| 7,047,279 B1 * | 5/2006 | Beams et al. | 709/204 |
| 7,065,568 B2 * | 6/2006 | Bracewell et al. | 709/223 |
| 7,136,927 B2 * | 11/2006 | Traversat et al. | 709/230 |
| 7,143,437 B2 * | 11/2006 | Royer et al. | 726/8 |
| 7,146,404 B2 * | 12/2006 | Kay et al. | 709/206 |
| 7,188,183 B1 * | 3/2007 | Paul et al. | 709/229 |
| 7,197,565 B2 * | 3/2007 | Abdelaziz et al. | 709/226 |
| 7,213,061 B1 * | 5/2007 | Hite et al. | 709/223 |
| 7,222,187 B2 * | 5/2007 | Yeager et al. | 709/237 |
| 7,225,249 B1 * | 5/2007 | Barry et al. | 709/227 |
| 7,263,560 B2 * | 8/2007 | Abdelaziz et al. | 709/238 |
| 7,272,625 B1 * | 9/2007 | Hannel et al. | 709/200 |
| 7,283,519 B2 * | 10/2007 | Girard | 370/353 |
| 7,290,056 B1 * | 10/2007 | McLaughlin, Jr. | 709/230 |
| 7,337,236 B2 * | 2/2008 | Bess et al. | 709/240 |
| 7,373,422 B1 * | 5/2008 | Paul et al. | 709/238 |
| 2001/0047477 A1 * | 11/2001 | Chiang | 713/170 |
| 2002/0065875 A1 * | 5/2002 | Bracewell et al. | 709/203 |
| 2002/0080822 A1 * | 6/2002 | Brown et al. | 370/475 |
| 2002/0133600 A1 * | 9/2002 | Williams et al. | 709/228 |
| 2002/0150226 A1 * | 10/2002 | Gallant et al. | 379/210.02 |
| 2002/0194262 A1 * | 12/2002 | Jorgenson | 709/203 |
| 2003/0110266 A1 * | 6/2003 | Rollins et al. | 709/227 |
| 2003/0174693 A1 * | 9/2003 | Gallant et al. | 370/352 |
| 2006/0155839 A1 * | 7/2006 | Hundscheidt et al. | 709/224 |

* cited by examiner

SYSTEM AND METHODS FOR CONTROLLING AN APPLICATION

RELATED APPLICATIONS

This invention claims the benefit of the filing date and disclosure contained in U.S. Provisional Patent Application No. 60/420,861 filed Oct. 24, 2002, entitled "METHOD AND SYSTEM OF INTERACTIVE MESSAGE MANAGEMENT." The above referenced Provisional patent application shares co-inventorship with, and is assigned to, the same assignee as the present patent application. The entire teachings and disclosure of this provisional patent application is hereby incorporated by reference.

BACKGROUND OF THE INVENTION

In conventional software applications, a user typically interacts with the application according to one of several methods in order to instruct the software application to carry out an operation or a series of operations on behalf of the user. The user either sends commands to the application through a command line interface, or interacts with the application through a menu-driven interface.

The first model requires the user to somehow know or learn the command language specific to the application. An alternative would be for the user to send detailed written instructions to the application, in which case the application parses the detailed text to derive significant meaning in order to carry out the desired operations on behalf of the user. This approach may be burdensome for the user and the application, and is also prone to errors.

With the widespread usage of graphical user interfaces (GUIs) on personal computers and other computer-based systems, users have become used to the second model of interaction, namely menu interfaces provided by applications. In such a case, the user chooses a particular application to use, and by selecting from choices, or commands, in hierarchical menus provided by the particular application, the user instructs the application to provide the desired service. This model then requires the user to select an application to use, to which the application responds with a set of top level menu choices. Each subsequent choice by the user leads to a display of additional menu or sub-menu choices until the desired command or action is reached.

Often, users require remote access to such applications from a remote location via a network interconnection. Remote access to applications is achievable in a variety of forms, including dialup modem, broadband, virtual private networks (VPNs), wireless, etc. Such remote access forms typically include a messaging system for transport of data to and from the application. Messaging systems provide mechanisms to enable transport of various types and formats of messages between multiple users and applications. A user typically employs a device operable in the format or protocol expected by the messaging system. Primitive messaging systems include paper mail and manually switched voice networks, involving a human operator to manually carry a hardcopy or connect a circuit. Modern communication systems include networks such as the legacy circuit switched voice telephone network, affectionately known as the Plain Old Telephone System (POTS), wireless cellular networks, broadband hybrid fiber/coax networks, the aggregation of packet switched public access interconnections known as the Internet, and packet-switched voice operating over the Internet generally known as Voice over IP (VoIP). With the wide penetration of Internet connectivity, mobile cellular phones, and other similar means of communication, various interpersonal messaging systems have gained widespread popularity and usage. Such messaging systems include email, voicemail, short messaging service (SMS), instant messaging (IM), paging, enhanced messaging service (EMS), multimedia messaging service (MMS) and others. One common aspect of such conventional messaging systems, however, is that each discrete messaging unit, or data element, is atomic. Typically aggregated atomic messaging units may be meaningful such that the recipient correlates, or aggregates, the multiple atomic message units for this purpose.

In a conventional interactive voice response messaging infrastructure, users employ user devices to communicate, or interact with an application via a sequence of actions over the course of a session. In a typical session, the user and the application exchange a set of requests and responses. The user initiates the typical session with a particular application, usually with a telephone call to a telephone number corresponding to the application. The application responds with a conventional acknowledgement message, usually an initial voice menu prompt. The user then answers the prompt with another action, typically specifying one of the options proposed by the prompt. The application maintains a state, or context with the user, indicative of the aggregate responses by the user. An exchange of interactions continues until the user navigates the hierarchy of menu options to the desired task, option, or response, thereby completing the session.

Communication systems employ connection oriented or connectionless transport mechanisms. Connection oriented mechanisms, such as Asynchronous Transfer Mode (ATM), for example, dedicate an enumerable endpoint, such as a port, to a transaction or session between communicating entities. Messages follow an ordered sequence between the endpoints, in which each endpoint knows the complementary endpoint and the arrival order mirrors the transmission order. Accordingly, a receiver in a connection oriented mechanism examines the endpoint and receipt sequence of the messages to ascertain the context of each message within a session.

Conversely, a connectionless transport mechanism employs atomic message units which impart little or no context information. A connectionless mechanism, such as the User Datagram Protocol (UDP) over the Internet Protocol (IP) does not necessarily dedicate a physical port or enumerable endpoint to a particular session. Further, a connectionless mechanism provides no guarantees of arrival sequencing, since routing paths for messages may follow different paths, even in the same session. Accordingly, in a connectionless transport infrastructure, session context information is encapsulated in the messages or message headers to identify message sequence, origin, destination, and other context enabling information. Accordingly, a conventional receiver may properly aggregate the set of messages defining a session.

In a typical conventional infrastructure, a protocol identifies the mechanism as connectionless or connection oriented. Either a routing component or the application itself, therefore, maintains the state of the user session, such as the point of progression along the menu hierarchy. However, each individual message in the session is atomic. A menu selection response from a user, for example, is not significant without correlation to the menu options to which it responds. In a typical conventional voice response network, such as the legacy voice telephone network, the connection remains dedicated to a voice session. The dedicated connection terminates in a port or other identifiable endpoint to which the application is responsive. Accordingly, the application maintains the session context by a reference to the open, dedicated connection line since the conventional voice infrastructure assumes such a dedicated connection (port) between endpoints.

Typically, the applications employ a state corresponding to each user to identify the context of a particular session based on the previous informational items or actions such as messages exchanged during that session. In an application including state based aspects as a menu driven interface, the state identifies a current position in the traversal of the menu hierarchy. Other aspects of the application typically depend on some type of state information. In a connectionless protocol, such as HTTP, for example, message attributes may contribute to a mechanism for identifying and aggregating atomic message units as part of a contiguous session.

On the World Wide Web, for example, the HTTP request/response protocol model is based on a single round trip interaction, where the client makes a request of the server and the server responds such that no state information is maintained between interactions. Minimal state information can be imposed on this model by taking advantage of a client-stored session id (cookie). Client/Server sharing of this conventional session identifier allows context to be maintained throughout multiple interactions without affecting the simplicity of a single round trip interaction.

SUMMARY

In a conventional software application, a user either sends commands through a command line interface or interacts with the application through its menu-driven interface. The command line model may be emulated in a message-based sessionless protocol. However, this model then requires the user to somehow know or learn the command language understood by the application. An alternative command line approach provides for the user to send detailed instructions in their message to the application which the application must parse to derive significant meaning. This approach is burdensome for both the user and the application, and tends to be somewhat error prone. In a conventional messaging system, such as SMS, which has message size limitations, the user is constrained to know the cryptic commands that operate within the constraints of the short message sizes. If the user makes a typographical error or is unfamiliar with the precise syntax of a command, the application simply reports that the user's input is incorrect. The application is similarly constrained by the message size in how much help text it can provide to the user.

An alternative is provided by the menu driven interface, more commonly employed by modern software applications, particularly for novice and/or nontechnical users. In a typical software driven application, the user establishes an interactive session with the application. The session defines a context in which the successive actions, typically information exchanges such as messages, between the user and application occur. For example, in a typically application, such as an Internet banking application, a user establishes a context via a login sequence to establish (authenticate) identity and designate a checking account. Successive actions between the user and the application need to reference the identified account, lest the user be required to reenter authentication and account information for each specific application selection or operation. Therefore, the typical application maintains a session identifier to maintain a context, or state information, about the particular user and actions which have transpired during the particular session. By way of further example, if the user desired to transfer funds between accounts, the application identifies the current account from the session context while obtaining the transfer account information from the user.

Over the past decade or so, with the widespread usage of graphical user interface systems on personal and other computers, users have become accustomed to menu-based interfaces provided by such software applications. In such a case, the user chooses a particular application to use, and by selecting choices (i.e. commands) in hierarchical menus provided by the particular application the user instructs the application to provide the desired service. This model typically requests that the user first select an application to use, to which the application responds with a set of top level menu choices. Each subsequent choice by the user leads to a display of additional menu or sub-menu choices until the desired action is reached.

The Interactive Messaging Manager (IMM), discussed further below, overcomes the complexity of a command-based interface necessitated by the sessionless protocol of a typical messaging system, overcomes the limitations imposed by the size of messages on the details that can be conveyed by the user or the application which may be required for complete explanations, and provides the convenience of a menu-based interface layered on top of a sessionless protocol.

In an exemplary configuration, discussed below, a conventional interactive voice response infrastructure relies on the dedicated voice connection between the endpoints to the exchange. The endpoints, typically a user device and an application, maintain a session via the open, dedicated connection such that a series of actions, such as an exchange of successive messages or other information exchange, occurs in the scope of a session context between the user device and the application. The session context allows successive actions or informational items to relate to previous actions so that the conventional application maintains a state corresponding to the user device. Such a state may, for example, refer to progression along a hierarchical menu structure driven by the application. Each successive entry by the user, such as a tone generated from numeric selection on the telephone keypad, refers to a navigation along the menus, in which a current menu, or "location," in the hierarchy is known so that the user transitions to the next menu relative to the previous. The session context enables the state information to be maintained and computed so that successive informational exchanges and actions (i.e. messages) may build on previous communications.

Embodiments of the invention are based in part on the observation that conventional voice-driven communication threads rely on a dedicated communication line (connection) to maintain a session context between a user and an application for the duration of a session. A user initiates a call to a particular application, and the application receives the call on a corresponding incoming line. Since the line remains open and dedicated to communications between the user and the application, the application refers to the identification of the dedicated line to maintain a context environment for successive informational actions and exchanges, or messages, within a session sequence (hereinafter "session"). The session-based nature of the dedicated voice connection, therefore, provides the context information for the exchange of informational items and actions included in the particular session which may be defined by the exchange of request and response messages or other communications.

Accordingly, such a conventional application does not lend itself well to invocation via a sessionless protocol, such as a text messaging transport mechanism, because conventional sessionless protocols provide no context information to correlate previous messages with current messages in a session involving a series of messages pertaining to the same session context.

In a conventional messaging system, an exchange of messages may include multiple atomic message items. In a text message environment, for example, conventional text messaging protocols provide an individual, atomic message for each transmitted data item, and provide no inherent reference to previous or successive data items. Accordingly, establishing a context, or state, between related data items is problematic. Attempts to operate a conventional interactive application on a conventional messaging infrastructure, or network, remain inoperative because each atomic message unit appears as a discrete, standalone unit, not a part of an ongoing session of informational items and actions. A conventional application employing a hierarchical menu structure, for example, may not be equipped to correlate previous user inputs to maintain a position, or session context, within the menu hierarchy without a mechanism for identifying successive actions or messages of the user as corresponding to previous actions within the session.

For example, a conventional voice menu operable over a conventional voice network maintains a dedicated line from the user device to a telephonic endpoint, such as a PBX or network port, responsive to the application. The user initially invokes the application by dialing the corresponding telephone number, and enters a top level menu. Successive user commands (i.e. keypad numeric entries) navigate through a menu hierarchy in response to prompts from the application. Each successive command navigates to a lower level menu relative to the preceding menu. Accordingly, the application needs to identify the current menu in order to navigate to the successive menu indicated by the user command.

For example, given the checking account example above, the typical application is operable to establish and serve multiple simultaneous users. Accordingly, the application maintains multiple session identifiers such that each user has an individual session. The application, therefore, identifies each respective individual session by a user specific parameter distinguishable from the corresponding user specific parameter of other users. A distinguishing parameter might be, for example, the port ID or telephone number of the network connection for the user session.

It would be beneficial, therefore, to enable an application to receive state information for a session emanating from a device operating in a stateless infrastructure. Such state information enables the application to reference a session context for the session, and employs the session context to maintain a state from previous atomic messages sent and received between the device and the application. By maintaining and referencing a session context indicative of previous messages in a session, an application identifies an atomic message as corresponding to a particular session context, and employs the session context to process the message within the context, or environment, defined by the previous messages in the session. In this manner, a stateless protocol such as a text messaging protocol is operable to invoke stateful applications from the stateless infrastructure by employing the session context. In order to provide efficient, reliable, messaging services to multiple users, the system described herein correlates, or aggregates, multiple atomic messaging units such that the aggregate message units are meaningful to the recipient.

In the conventional connection oriented infrastructure, an application identifies a session based on the telephone number of the user and the port serving the dedicated connection. In a particular implementation, the conventional applications identify the session, and hence the corresponding user device, via a routing component operable to identify the port and provide the session identification to the application. In the interactive voice response infrastructure described above, the voice based endpoint served by the user device connects to the routing component via a text to speech (TTS) component and automatic speech recognition (ASR) component for transforming the voice signals to and from the user device. Since the TTS and ASR components rely on an assigned, dedicated port identification to identify a session, a particular implementation including a text messaging mechanism may leverage the port-based session identification in the TTS and ASR components for maintaining a session by correlating text message data items with the identified port corresponding to the session.

By way of further example, given the checking application above, such an application might well have both a voice driven interface and a menu input driven interface. By encoding and/or processing speech accordingly, the same application logic for a hierarchical menu tree is operative to process both the voice menu and keyboard menu sessions. A particular exemplary application of the IMM, described further below, integrates the session context identification with the port selection and identification mechanism for an existing application. In the checking account example, the voice menu selection correlates the session context with the incoming port of the telephonic user via the TTS and ASR components.

The exemplary IMM implementation employs a session based interface component including TTS and ASR components modified to correlate the user with an emulated, or generated port ID which operates as a session context identifier. Therefore, the checking account user becomes associated with the emulated port ID in the TTS and ASR components. The session manager maintains the emulated port ID with the telephone number of the user. Actions, or messages, corresponding to the session reference the emulated port ID (from the application) or the telephone number (from the user), and the session manger indexes the value accordingly in the session table.

In further detail, the interactive messaging manager provides a method of controlling an application by receiving a first message from a user telecommunication device, such as a wireless phone, via a non-session based messaging protocol. The interactive messaging manager establishes or maintains a session context that maps messages transferred from the device using the non-session based protocol to a session-based application controlled using a session-based protocol. Using the established session context from the interactive messaging manager, an application message interpreter maps the first message from the device using the non-session based messaging protocol to the session-based protocol using the maintained session context to allow the device to control the session-based application. The interactive messaging manger then maps a second, response message received from the application using the session-based protocol from the session-based application. The interactive messaging manager maps the response message to the user device operative in the non-session based protocol using the maintained session context to return the second message to the device.

The method therefore provides context specific application support for an interactive user device in an information transport infrastructure by receiving a message from a user via a user device and corresponding to an application for transmission to, or invocation of, the application. The interactive message manager identifies a session context between the application and the user device, in which the session context is based on the identity of the user device and the identity of the corresponding application. The application processes the message according to the identified session context, and maps successive session messages between the user device and the application. The IMM maps the messages by indexing the user device identity and application identity to preserve the session context by maintaining the order of messages between the user device and the application.

Therefore, in further detail, the initial, or first, message serves to invoke the application and create the session context, therefore establishing the session context via the first message. In a text messaging environment, for example, the first message is indicative of the application to establish the session context between the text messaging user device and the application, and invokes the application in a manner responsive to the session context and operative to send and receive messages corresponding to the established session context. Establishing the session context further involves receiving a unique preexisting identifier corresponding to the application, and creating a session context entry in a session table based on the identity of the user device and the unique preexisting identifier. Further, in addition to being indicative of the application, the first message may also transport an implicit or explicit command to the identified application. As a parallel example, many command line invoked applications, such as legacy DOS based applications, allow the invoking user to invoke the application merely by typing the application name to the command prompt, or by typing the command prompt followed by parameters or commands which the application accepts as input. Such alternatives provide options for "power users" who desire speed and do not require explicit prompts. Successive communications following the initial message between the user device reference the corresponding application via the unique preexisting identifier.

In a particular implementation, such as a text messaging environment supported by the short message service (SMS), as described herein, mapping successive messages includes mapping to the same application by indexing the identity of the user device and the unique preexisting identifier of the application into a session table having session context entries of wireless telephone numbers and application short codes. Therefore, in an SMS environment, the session table is indexed by the telephone number of the user device and the short code of the application. The session table allows the interactive messaging manager to emulate a connection ID in the interactive voice response infrastructure by associating the session context with an emulated port ID via the session manager table.

In such an SMS configuration, establishing the session context includes receiving a short code corresponding to the application. The short codes are typically predefined by the text message service provider as corresponding to the application. The messaging manager creates a session context entry in a session table based on the identity of the user device (i.e. telephone number) and the short code, and either directly invokes the application or references an executable entity, such as a script operative to invoke the application.

The session context is operable to maintain state information by referencing and maintaining a connection of the application in a stateful interactive infrastructure to the user device by maintaining the order and sequence of messages sent between the application and the user device. Such a session context terminates upon explicit request from the user, or after a reasonable timeout by the session manager or application.

It should be noted that the text messaging application described herein is an exemplary implementation of the system for preserving the session context between an application and a wireless device. The session context identifies each message such that the recipient, either the wireless device or the application, identifies previous messages in the same context to allow each recipient to process a message in light of other messages in the session context. The system identifies the session context via a session ID, discussed herein in particular implementations as at least one of a port ID, an emulated port ID, an application specific identifier, a session context ID, a source and a destination. It will be apparent to those of skill in the art that various methods for indexing and maintaining a session context are applicable in addition to the session table implementation disclosed herein.

Alternate arrangements include other protocols such as instant messaging, in which the interactive messaging manager maps the successive messages from the user or user device to the same application by indexing the identity of the device and the unique preexisting identifier of the application into a session table having session context entries of protocol specific identifiers according to the instant messaging protocol. Such protocol specific identifiers may include, for example, user ID, buddy ID, screen name, aim ID and nickname corresponding to the user device. Other configurations may include session context entries of user email addresses and application short codes, for operation according to an email protocol. Other protocols and identification operations to associate the identity of the user device and the identity of the application to establish and maintain a session context will be apparent to those of skill in the art. Such exemplary applications include, by way of example only, legacy paging systems, advance text messaging systems, such as Enhanced Messaging Service (EMS), Multimedia Messaging Service (MMS), and voice messaging employing audible analog signals, encoded appropriately. Other implementations and underlying transport protocols may be envisioned without departing from the spirit and scope of the claimed invention.

Integration of the interactive messaging manager in an interactive voice response infrastructure, illustrated herein as a particular exemplary configuration, is facilitated by adapting existing speech responsive components for text message operability. In particular arrangements, mapping between the application and the user device occurs via a text to speech interconnection (TTS) component and an automatic speech recognition (ASR) interconnection component, in which the interconnection components are operable to integrate text message data to interfaces in the preexisting infrastructure.

Other arrangements of embodiments of the invention that are disclosed herein include software programs to perform the method embodiment steps and operations summarized above and disclosed in detail below. More particularly, a computer program product is disclosed that has a computer-readable medium including computer program logic encoded thereon that when performed in a computerized device provides the associated processing operations as explained herein either on the interactive messaging manager or in the corresponding application. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of telecommunications voice infrastructure servers can also provide the system of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

The present invention substantially overcomes particular shortcomings of the above described conventional methods of conventional voice-driven communication threads which rely on a dedicated communication line (connection) to maintain a session context between a user and an application for the duration of a session. In such a conventional arrangement, a user initiates a call to a particular application, and the application receives the call on a corresponding incoming line. Since the line remains open and dedicated to communications between the user and the application, the application refers to the identification of the dedicated line, typically via a port ID, to maintain a context environment for successive exchanges, or messages, within a session sequence (session). The session based nature of the dedicated voice connection, therefore, provides the context information for the exchange of messages included in a particular session defined by the exchange of request and response messages.

Accordingly, such an application does not lend itself well to invocation via a sessionless protocol, such as a text messaging transport mechanism, because conventional sessionless protocols provide no context information to correlate previous messages with current messages in a session involving a set, or series of request and response messages pertaining to the same session context.

The interactive messaging manager described further below enables an application to receive and maintain state information for a session emanating from a device operating in a stateless infrastructure. Such state information enables the application to reference a session context for the session, and employ the session context to maintain a state from previous atomic messages sent and received between the device and the application. By maintaining and referencing a session context indicative of a state defined by previous messages in the session, an application identifies an atomic message as corresponding to a particular session context, and employs the session context to process the message within the context, or environment, defined by the previous messages in the session. In this manner, a stateless protocol such as a text messaging protocol is operable to invoke stateful applications from the stateless infrastructure by employing the session context.

Figure 1:
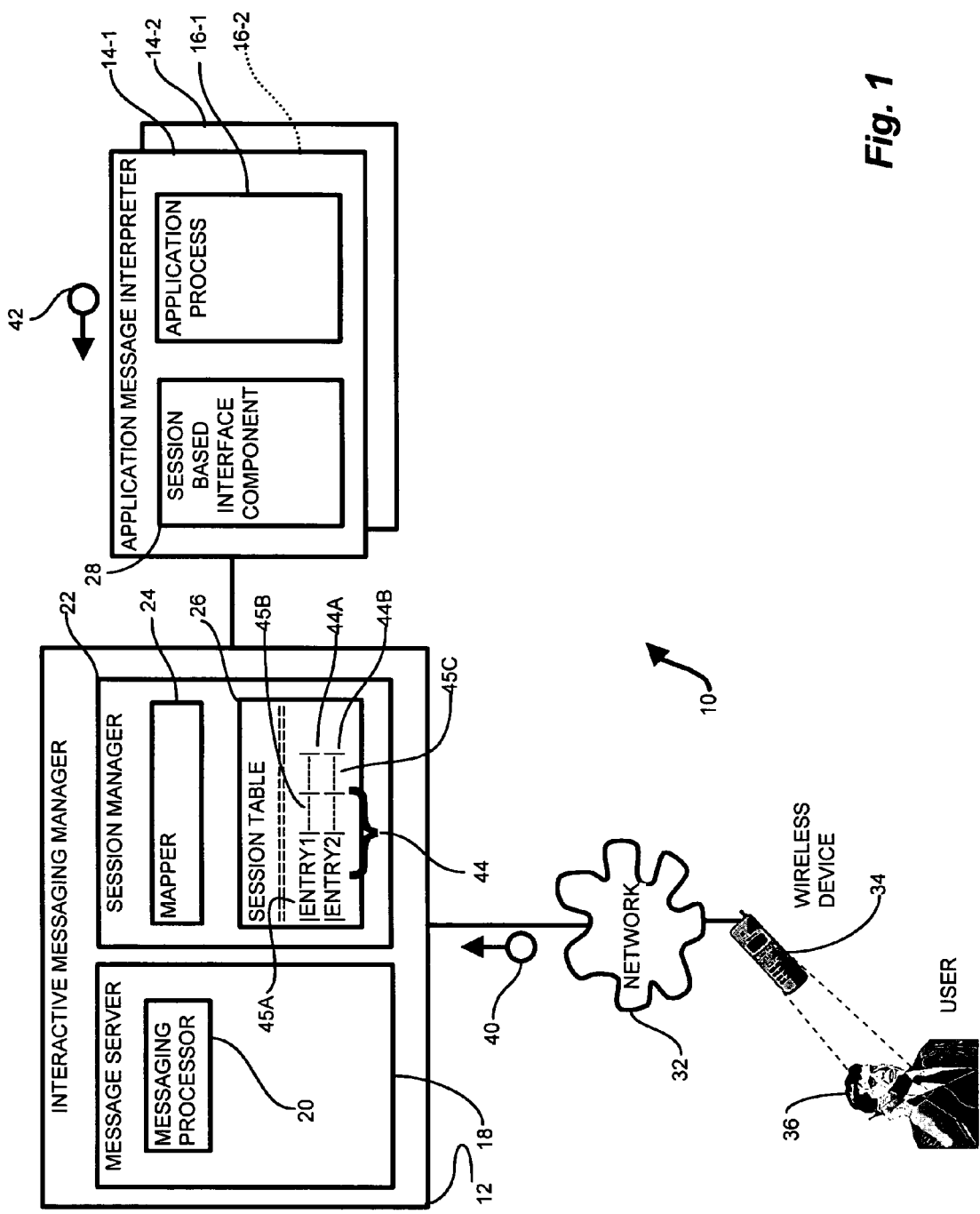
FIG. 1 is a context diagram of an infrastructure and system for dispatching user messages to an application on an interactive voice response infrastructure.

FIG. 1 is a context diagram of a system 10 for dispatching user messages to an application on an interactive voice response infrastructure. Referring to FIG. 1, an interactive voice response infrastructure is deployable on the exemplary computer system 10. The exemplary computer system 10 includes an interactive messaging manager 12 and a plurality of application message interpreters 14-1 . . . 14-N (14 generally). The interactive messaging manager 12 includes a message server 18 having a messaging processor 20 and a session manager 22 having a mapper 24 and a session table 26 for storing session context entries 44 (session contexts), discussed further below. The application message interpreter 14 includes a session-based interface component 28-N corresponding to each application 16. A public access network 32 such as the legacy Plain Old Telephone Service (POTS) network as is known in the art and/or the Internet connects customer equipment such as wireless devices 34 serving a user 36 for transmitting messages 40 to the applications 16. The applications 16 are generally responsive to the user messages 40 with application specific data in response (return) messages 42.

The interactive messaging manager 12 operates to identify and route the incoming messages 40 to a particular application 16 based on the session context 44. The message server 18 connects to the session manager 22 for identifying an existing context or creating a new context 44 in response to a user message 40, 42. The session manager 22 performs a lookup in the session table 26 using the mapper 24 to identify or create a session context 44 entry.

The session based interface component 28 translates or transforms the messages 40, 42 to and from the appropriate application 16, and also directs the response messages 42 from the application 16 to the corresponding invoking user device 34. The applications 16 process the incoming messages 40 and respond with response messages 42, for transmission back to the invoking user device 34.

In operation, the user 36 transmits a message 40 from a wireless device 34 or other user equipment (not specifically shown) via the network 32 to the interactive messaging manager 12. The message server 18 receives the message 40 and processes the message 40 using the messaging processor 20 to determine that it is an application 16 based messages having session fields 45A . . . 45C (45 generally). The message server 18 sends the message to the session manager 22, which employs the mapper 24 to map one or more of the session fields 45 into the session table 26 and determine a corresponding entry 44 having a session context identifier 45A. Using the existing or newly created entry 44, the session based interface component 28 receives the identified session identifier 45A, such as a port, discussed further below, and routes it to the corresponding application 16. Depending on the interface medium (i.e. text, voice, binary, etc.), the interface component 28 may transform the message 40 corresponding to the session context identifier 45A into the form expected by the application 16, i.e. by text to speech processing, for example. In a particular implementation, the interface component 28 invokes a scripting language for supporting voice messages, such as Voice Extensible Markup Language (VXML), described further below. After receiving the session context identifier 45A, the application message interpreter 14 routes the message 40 to the corresponding application 16 indicated by the session context 44. The IMM 12 processes and routes response messages 42 from the application back to the sending user device 34 by a reverse lookup in the session table according to the application ID 55B, and manipulating source and destination fields accordingly (i.e. such as swapping source and destination fields). In this manner, a successive stream of messages 40, 42 between a user device 34 and an application 16 are exchangeable by mapping to the session context entry 44 via the session context identifier field 45A.

As indicated above, conventional voice communication infrastructures employ a connection oriented protocol which dedicate a particular connection to the user. In such conventional systems, the user device 34 and a conventional communications port (not specifically shown) are endpoints which define the connection. In such conventional voice response systems, a user 36 initiates calls 35 which the conventional POTS infrastructure, for example, directs to a particular port. The application 16 identifies the connection, and therefore the session context, by the port from which communications from the user device 34 emanate.

Figure 2:
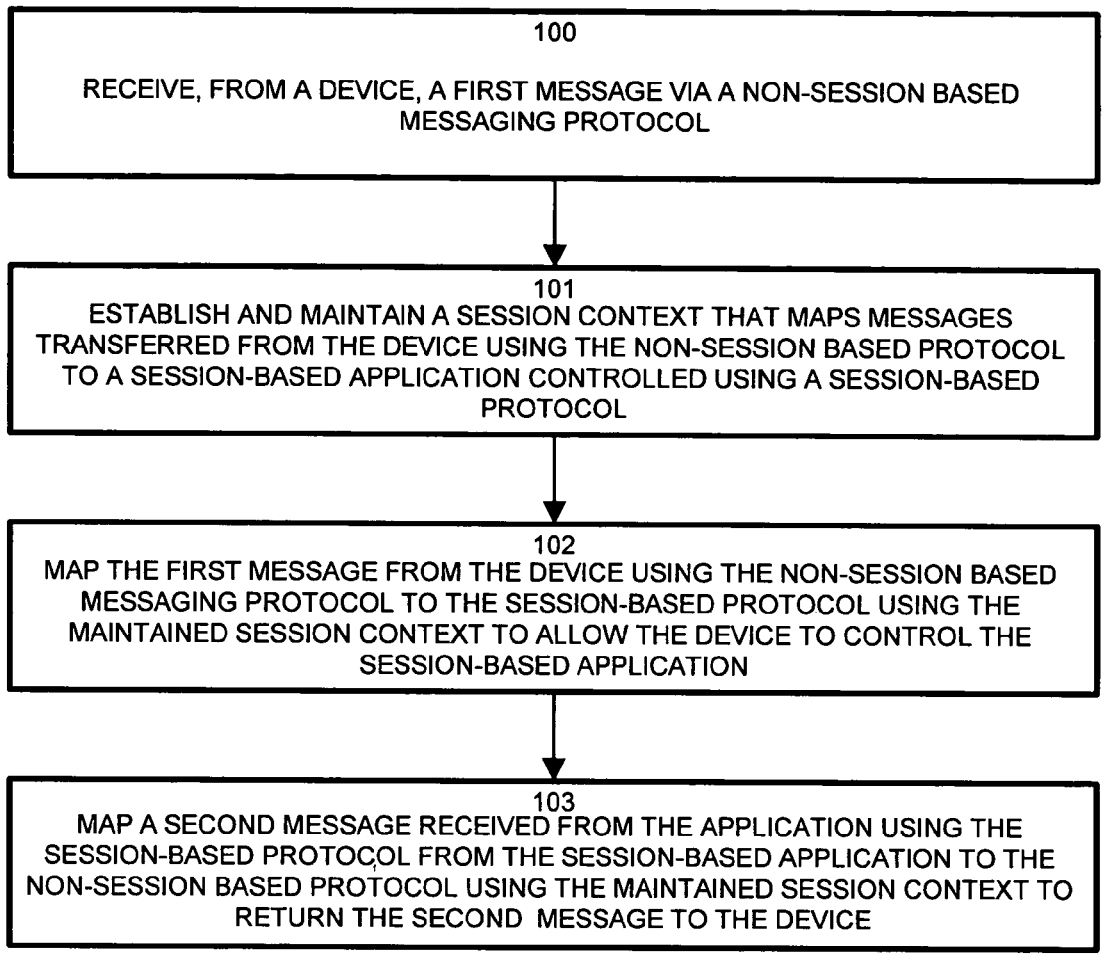
FIG. 2 is a flowchart of processing messages between a user and an application in the infrastructure in claim 1.

FIG. 2 is a flowchart of processing messages between a user and an application in the infrastructure in claim 1. Referring to FIGS. 1 and 2, at step 100, the message server 18 receives a first message 40 from a user wireless device 34 via a non-session based messaging protocol such as a text messaging protocol. The messaging processor 20 identifies the underlying protocol of the message, such as a text messaging, instant messaging, or email. The messaging processor 20 invokes the mapper 24 to identify or create the session context entry 44, and identifies the type of the underlying protocol for the response message processing, discussed further below.

The session manager 22 establishes, if appropriate, and maintains, the session context 44, as depicted at step 101. The session manager 22 employs the mapper 24 to map messages 40 transferred from the user device 34 using the non-session based protocol, such as text messaging, to the session-based application 16, typically controlled using a session-based protocol such as a conventional open voice connection terminating in a port.

At step 102, the mapper 24 maps the first message 40 from the device using the non-session based messaging protocol to the session-based protocol using the maintained session context 44, thereby allowing the device 34 to control the session-based application 16. The application message interpreter 14 routes and receives a second, or return message 42 from the application 16, discussed further below.

The session manager 22 receives a second message 42 from the application 16, as shown at step 103. The session manger 22 maps the message 42 from the session-based protocol from the session-based application 16, to the non-session based protocol, such as text messaging, using the maintained session context to return at least a portion of the second message to the device 34 referenced in the session table 26. The response message 42 may include session context information for the aforementioned mapping, such as the user telephone number 55C, and hence may strip off a portion and return only a portion of the message 42 to the user device 34. The session manager 22 identifies the session context 44 corresponding to the return message 42 to enable the user device 34 to receive the response message 42. In this manner, the session context is applicable to a variety of messaging mechanisms, or protocols, such as text messaging, instant messaging, and email, as well as others which will be apparent to those of skill in the art.

Figure 3:
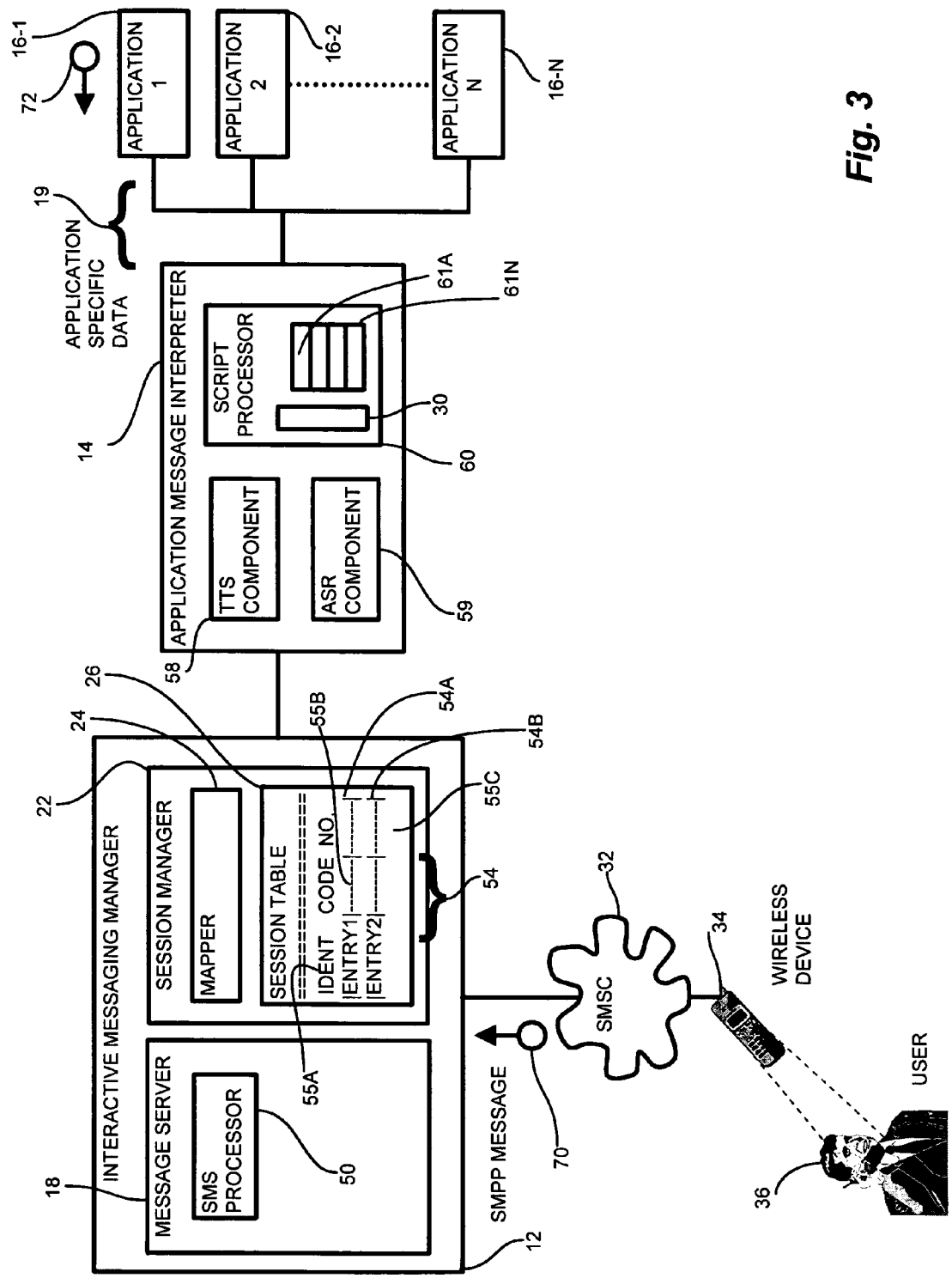
FIG. 3 is a block diagram of a message manager for processing messages according to an established session context from a user messaging device using a sessionless messaging protocol.
Figure 4:
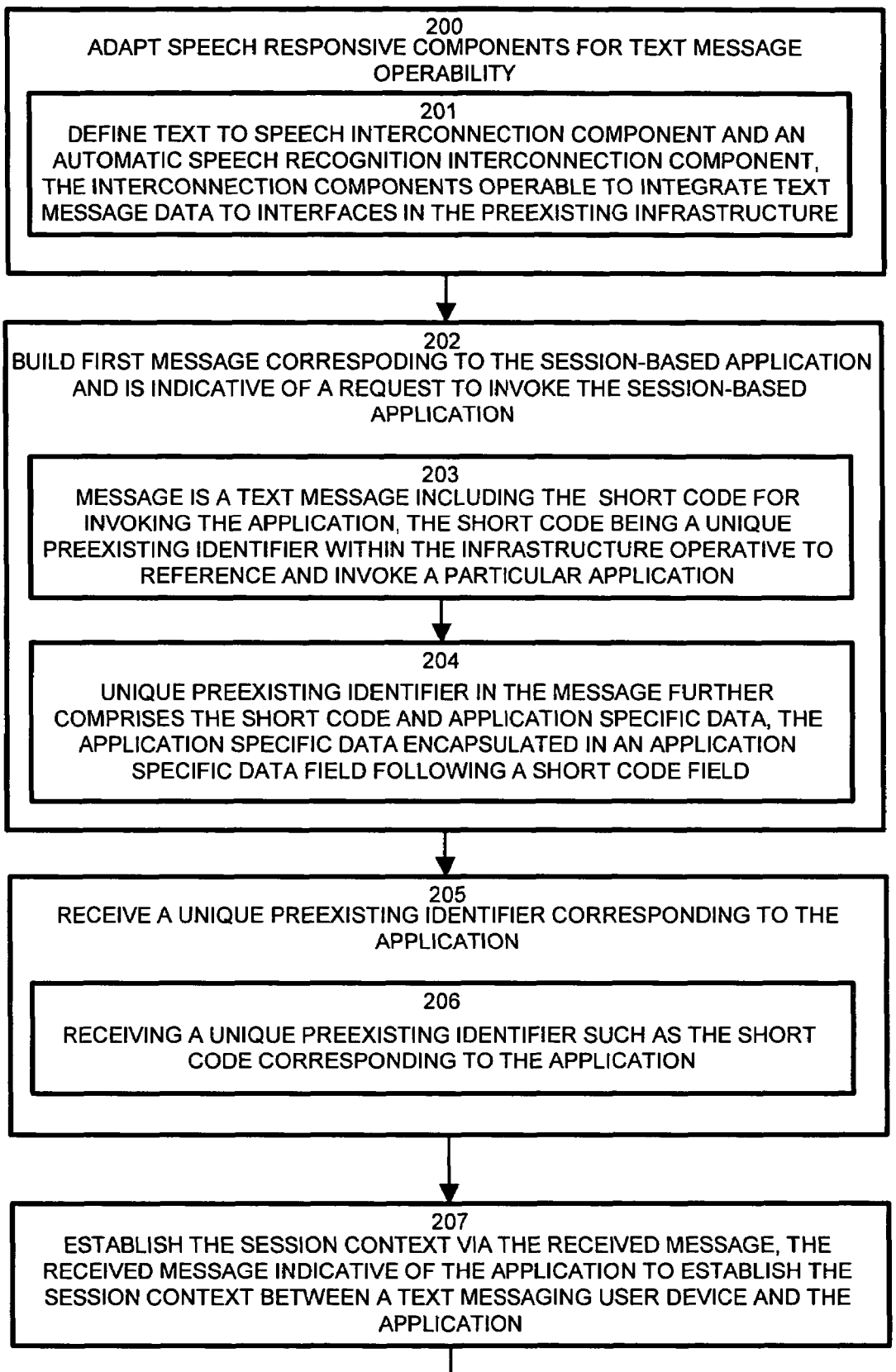
FIGS. 4-7 are a flowchart of message processing in the interactive message manager of FIG. 3.
Figure 5:
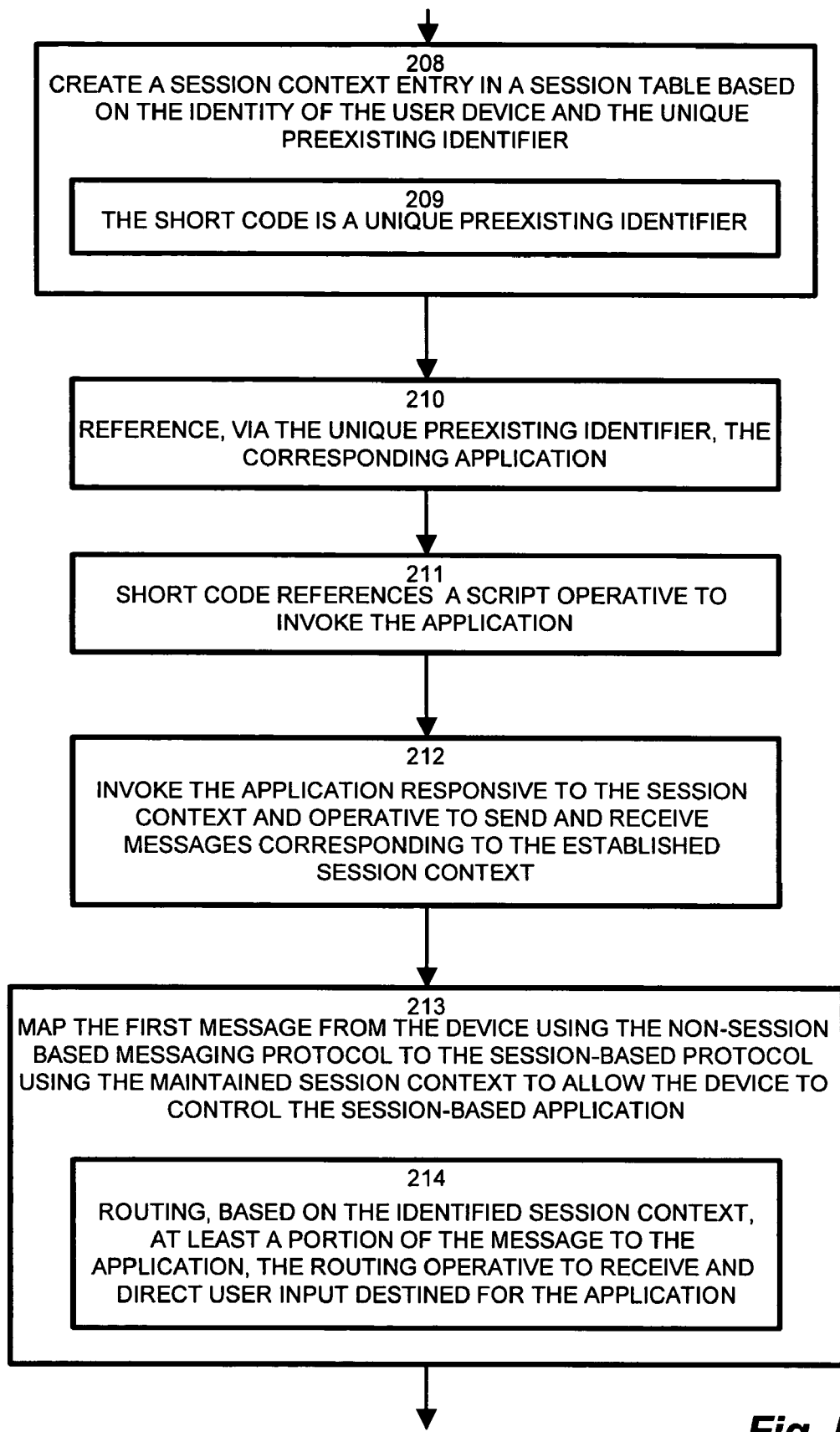
Figure 6:
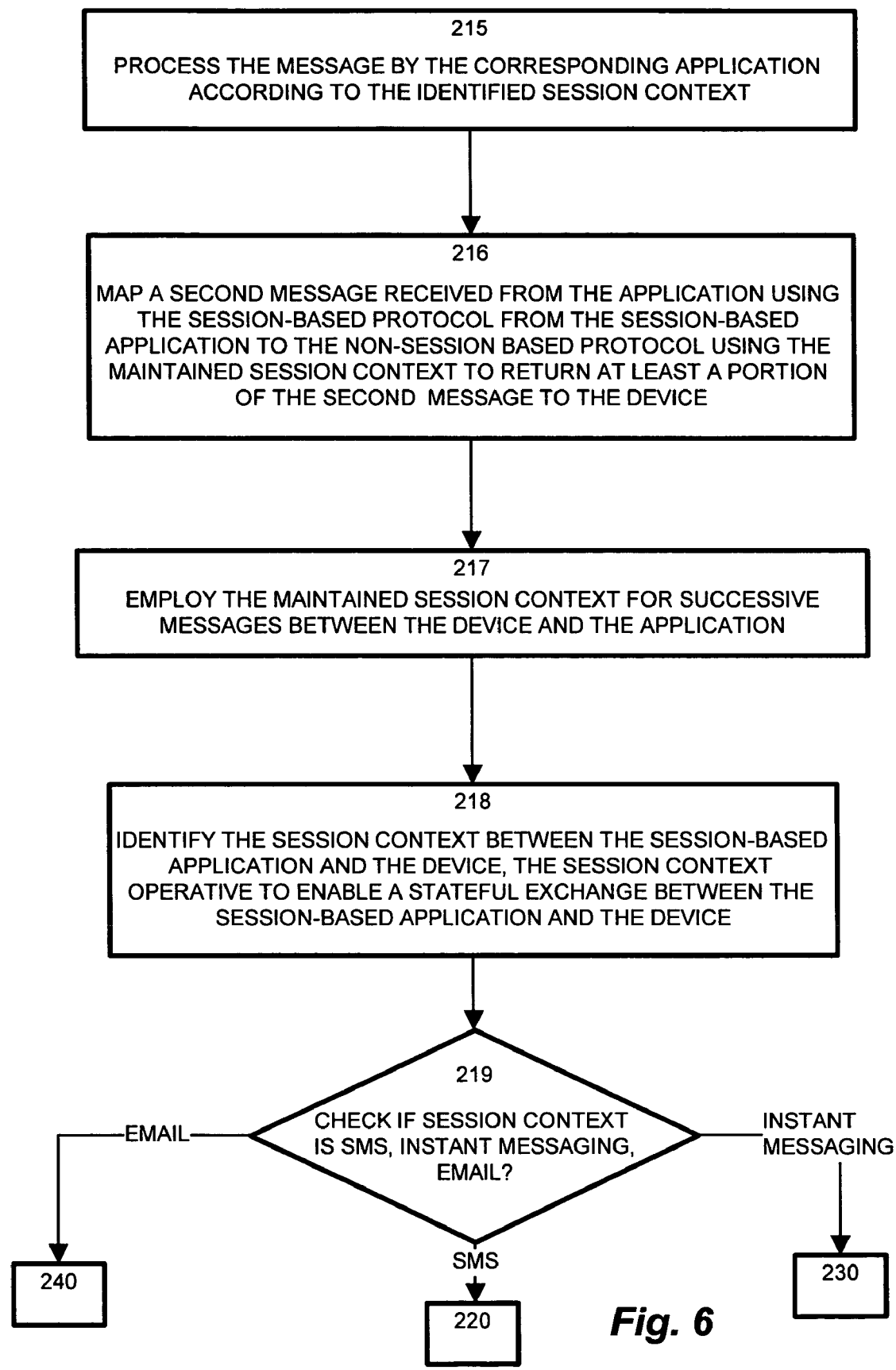
Figure 7:
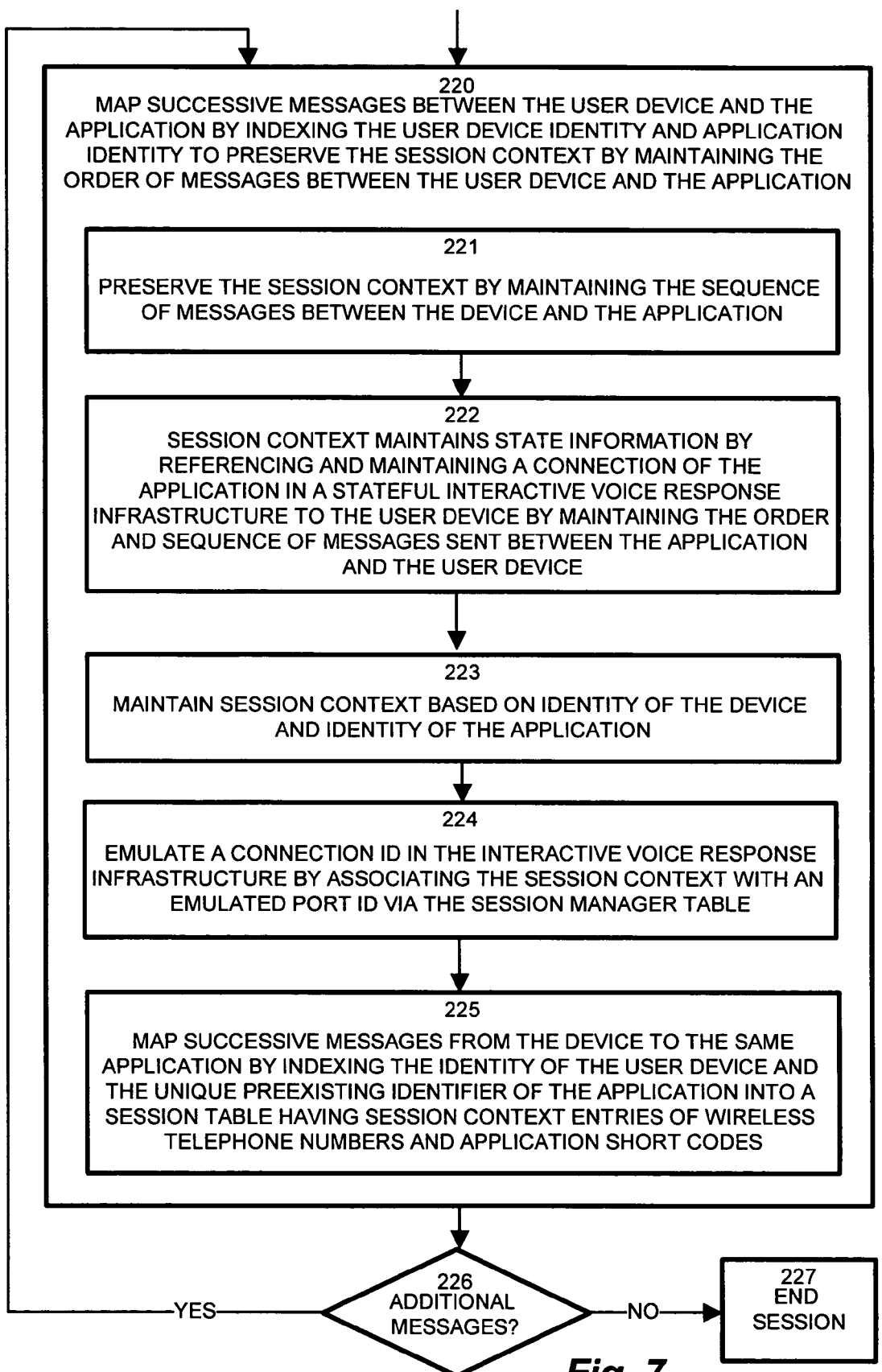

FIG. 3 is a block diagram of the interactive messaging manager 18 for processing messages according to a session context 54 from a user messaging device 34 using a sessionless messaging protocol. In the particular arrangement, shown in FIG. 3, a user device 34 establishes a session context 54 entry (session context) with an application 16 by initiating a text message 70 indicative of the application 16. The text message 70 invokes the application 16 and establishes a session context 54 for a series of messages 70, 72 between the user device 34 and the application 16, as will now be discussed with respect to FIGS. 1, 2, and 3.

Referring to FIG. 3, the interactive messaging manager 12 includes the message server 18 having a Short Messaging Service (SMS) processor 50. The short messaging service is a text messaging protocol for associating a user device request with a particular application 16. A text messaging user 36 enters a short code 55B corresponding to the application 16, in the same manner as entering a telephone number, and the user device 32 transmits a text message 70 including the short code 55B to the SMS processor 50.

The text messaging configuration lends itself particularly well to the session based control mechanism described herein. A typical text message 70 is a sessionless message, in that it is a standalone, atomic unit which bears no direct association to other messages, absent some form of session context 54 association as discussed herein. Transmission is also typically a discrete one-time occurrence which leaves no persistent session following transmission completion. Employing the existing voice response infrastructure for a text message 70, rather than voice, format allows existing applications 16 to adapt to the text messaging control by providing a session context 54 to aggregate multiple stand alone messages 70, 72. The exemplary text messaging application 16-1, therefore, integrates text responsive logic in lieu of speech responsive logic in the session based interface component 28 of FIG. 1.

Conventional interactive voice response mechanisms identify a port 39N assigned to the incoming calls 35 for the duration of the session. The text messaging implementation identifies a session context 54 by emulating a port 39N number corresponding to the session context 54. The port number, therefore, identifies a session context 54 defined by a user device telephone number and the application short code corresponding to the application. Such an implementation leverages existing speech based applications by integrating the text messaging session context 54 in a manner consistent with the former speech based control in the session based interface component 28 previously discussed in FIG. 1.

The session manager 22 includes the mapper 24 and the session table 26. The session table 26 identifies sessions, and therefore the session context 54, by the telephone number of the user wireless device 34 and the short code of the application 16. The session table 26 is a table of application short codes 55B and user telephone numbers 55C associated to a session context entry 54 identified by an entry ID 55A, described further below.

In further detail to FIG. 1, the application message interpreter 14 connects to applications 16-1 . . . 16-N (16, generally) by any suitable local or remote application logical interconnection 19. The logical interconnection 19 includes interprocess mechanisms on the same computer, or remote interconnections to allow the applications 16 to be based on another computer or processor. The application message interpreter 14 also includes a text to speech (TTS) component 58 and an automatic speech recognition (ASR) component 59, which collectively perform the function of the session based interface component 28 of FIG. 1. The TTS 58 and ASR 59 components connect to a script processor 60, which executes an application specific script 61A . . . 61N corresponding to a particular application 16. The script processor 60 operates as an application dispatch processor 30 for the text messaging data 70 from the user device 34. Depending on the identified session context entry 54, the script processor 60 routes the message 70 to the corresponding application 16 based on the session context 54.

In a particular arrangement, the script processor 60 is a VXML interpreter operable to execute scripts corresponding to the application 16. The VXML interpreter is operable to accept a port ID for identifying the application 16. The TTS 58 and ASR 59 components are adapted to interpret the emulated port ID 55A from the session table 26. Accordingly, user device 34 operable for text messaging is enabled for usage on applications 16 formerly controlled over dedicated voice lines via VXML.

It should be further noted that the exemplary script processor 60 employs VXML scripts as a particular configuration. Alternate configurations may employ compiled language constructs, other scripting formats, remote method invocation, and other forms and methods of transferring control to or via an executable entity.

Figure 8:
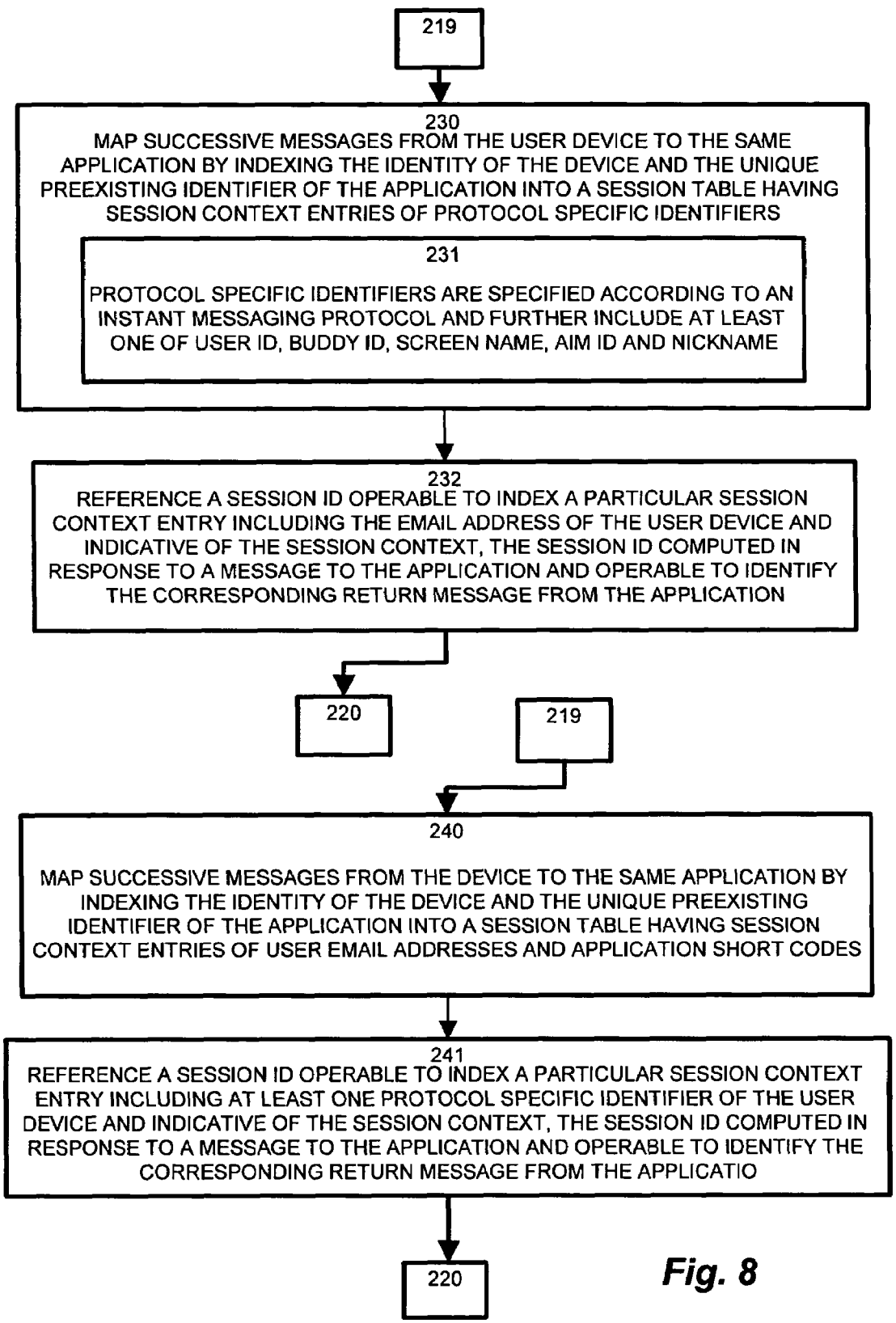
FIG. 8 is a further flowchart of message management using instant messaging and email based endpoints.

FIGS. 4-7 are a flowchart of message management in the message manager of FIG. 3, and FIG. 8 shows alternate configurations of the flowchart in FIGS. 4-7. Referring to FIGS. 4-8 and 3, at step 200, prior to transmitting actual message traffic in an interactive voice response infrastructure, an operator or engineer adapts the speech responsive components for text message operability. As indicated above, the session based interface component 28 include the speech responsive components for text to speech (TTS) 58, and automatic speech recognition (ASR) 59. At step 201, the mapping between the application 16 and the user device 34 occurs via a text to speech interconnection component and an automatic speech recognition interconnection component. The engineer or developer generates the TTS component 58 and the ASR component 59 by modifying an existing voice port cognizant interface or developing an alternate interface. The interconnection components 58 and 59 are operable to integrate text message data to interfaces in the preexisting infrastructure.

The user device 34 builds the first message corresponding to the session-based application 16 and which is indicative of a request to invoke the session-based application 16. At step 203, the first message is a text message 70 including the short code (code) 55B for invoking the application 16. The short code 55B is a unique identifier which is predefined and associated with a particular application 16 within the infrastructure, and operative to reference and invoke the particular application 16 for an interactive text messaging user device 34, as disclosed at step 203. The text messaging user 36 invokes the application 16 by keying in the short code 55B as if it were a telephone number (note that the short codes have a different digit length than valid telephone numbers to distinguish).

Optionally, the short code 55B (i.e. unique preexisting identifier) in the message 70 further comprises the short code 55B and application specific data, the application specific data encapsulated in an application specific data field following a short code field, as depicted at step 204. As indicated above, the short code 55B has a different digit count than a "live" telephone number. In a typical infrastructure, the short code 55B is four digits. However, the short code 55B may be followed by additional digits. Any additional digits represent additional data which is passed by the application messaging interpreter 14 to the end applications 16.

At step 205, the session manager 22 receives the unique preexisting identifier corresponding to the application 16 to establish the session context 54. In the particular exemplary configuration illustrated, the unique preexisting identifier is the short code 55B corresponding to the application 16, as depicted at step 206. Since the short codes 55B are predefined in the infrastructure to correspond with a particular application 16, the short code 55B provides a deterministic key to the application 16.

The session manager 22 establishes the session context 54 via the message 70 from the user device 34. Since the message 70 includes the short code 55B or other unique identifier, the received message 70 is indicative of the application 16 to establish the session context between a text messaging user device 34 and the application 16, at depicted at step 207.

At step 208, the mapper 24 creates a session context entry 54 in the session table 26 based on the identity of the user device 34 and the unique preexisting identifier. The unique preexisting identifier may be the short code, in the exemplary configuration, as shown at step 209. The session context 54 also includes the telephone number 55C of the user device 34, for distinguishing the session context 54 from that of other user devices 34. At step 210, the application message interpreter 14 receives the message 70 to reference, the corresponding application 16 via the unique preexisting identifier, using the TTS component 58 to correlate the message 70 to the emulated port identification 55A identifying the session context 54.

At step 211, the script processor 60 references a script 61A . . . 61N operative to invoke the application 16 via the identifier 55A, such as the emulated port ID. The scripts 61A . . . 61N (61 generally) are specific to a particular application 16, and execute following routing decisions by the mapper 24 as to which application 16 corresponds to the session context 54. As indicated above, the scripts are VXML scripts associated with a particular application 16 and corresponding short code 55B. Note that the first message in the session establishes the session context entry 54, and invokes the application 16, while successive messages, described further below, identify the established session context 54 between the user device 34 and the application 16. In this manner, the session context 54 may be considered as an exchange of commands and responses from the user device 34 to the application 16.

Accordingly, the referenced script 61 invokes the application 16 in a manner responsive to the session context 54 and operative to send and receive messages 70, 72 respectively, corresponding to the established session context 54, as depicted at step 212.

At step 213, the application interconnection 19 maps the message 70 from the device to the application 16. The interconnection 19, therefore, transmits the message 70 from the non-session based messaging protocol (text messaging) to the session-based protocol environment in which the application 16 executes using the maintained session context 54 to allow the device 34 to control the session-based application 16. Mapping, or delivering, the message 70 involves processing the user data in the message 70 via the script processor 60, according to the routing data from the message 70 by the session manager 22. Accordingly, delivering the message 70 to the application 16 further includes routing, based on the identified session context 54, at least a portion of the message 70 to the application 16, in which the routing is operative to receive and direct user input destined for the application 16, as depicted at step 214.

At step 215, the application 16 receives the message 70 corresponding to the application, and processes the message 70 according to the identified session context 54. As indicated above, the session context 54 identifies the state represented by aggregation of a series of messages 70, 72 up until the current point in processing. In the exemplary menu application, in the case of a new message, the menu begins at the top level. In the case of an existing session context 54, the user input applies to the current menu in the session context.

The application processing results in a second, or response, message 72 from the application 16 back to the invoking user device 34. Accordingly, at step 216, the application message interpreter 14 maps a second message 72 from the application 16 using the session-based protocol from the session-based environment of the application 16. The interactive message manager 12 maps the response message 72 to the non-session based protocol using the maintained session context 54 to return at least a portion of the second message 72 to the device by identifying the user telephone number 55C in the session table 26. The session context 54 is maintained to employ the session context 54 for successive messages between the device 34 and the application 16, as shown at step 217. The identified session context 54 between the session-based application 16 and the device 34 is therefore operative to enable a stateful exchange between the session-based application 16 and the device 34, as described at step 218.

As indicated above, processing of the session context 54 includes determining the underlying protocol of the incoming messages from the user device 34. At step 219, a check is performed to determine if the session context 54 corresponds to an SMS session, an instant messaging session, or an email session. If the session context 54 refers to an SMS originated application invocation, then the user device 34 is communicating via text messaging. Accordingly, at step 220, the session manager 22 maps successive messages 70, 72 between the user device 34 and the application 16 by indexing the user device identity 55C (telephone No.) and application identity 55B (short code) to preserve the session context 54 by maintaining the order of messages 70, 72 between the user device 34 and the application 16.

Routing the messages 70 to the application 16 operates to preserve the session context 54 by maintaining the sequence of messages 70 between the device 34 and the application 16, as shown by step 221. The maintained session context 54 is therefore operable to maintain state information by referencing and maintaining a connection of the application 16 in a stateful interactive voice response infrastructure to the user device 34 by maintaining the order and sequence of messages 70, 72 sent between the application 16 and the session manager 22, as depicted at step 222. In particular implementations, depending on the transport mechanism of the network 32, order and sequence are maintained in entirety between the application 16 and the user device 34. However, while the session manager 22 is operable to maintain context according to the session table 26 and control delivery to and from the application 16, the external network 32 is outside the scope of control of the IMM 12. At step 223, the session context 54 is maintained based on the identity 55C of the device and the identity 55B of the application 16, therefore allowing multiple session contexts 54 between multiple user devices 34 and an application 16, or between a particular user device 34 and multiple applications 16.

As indicated above, the session context entry 54 emulates a connection ID provided by an endpoint port 39N in a voice system which dedicates a line to the session. The entry ID 55A operates as the emulated port ID, as shown at step 224. Accordingly, mapping the successive messages 70, 72 further includes emulating a connection ID in the interactive voice response infrastructure by associating the session context 54 with an emulated port ID 55A via the session manager table 26. In the exemplary SMS configuration shown, the identity of the user device 34 is the unique 10 digit telephone number of the device, and the identity of the application is the short code. Accordingly, as depicted in step 225, mapping the successive messages 70, 72 includes mapping successive messages from the device 34 to the same application 16 by indexing the identity of the user device 34 (i.e. telephone number) and the unique preexisting identifier of the application 16 (i.e. short code) into the session table 26 having session context entries of wireless telephone numbers 55B and application short codes 55C.

At step 226, a check is performed to determine if there are any more messages for exchange in the current session. Termination of the session is upon an explicit request by the user device 34, termination of the script invoking the application 16 (i.e. application termination) or by expiration of the session context 54 after a reasonable predetermined timeout by the session manager 22. If there are more messages 70, 72, control reverts to step 220 to process successive messages 70, 72. Otherwise, the session is complete, as shown at step 227.

FIG. 8 illustrates alternate configurations for establishing and maintaining the session context 54 via alternate data identifiers. Referring to FIG. 8, if the check at step 219 indicates an instant messaging session, then mapping the successive messages 70, 72 includes mapping successive messages 70 from the user device 34 to the same application 16 by indexing the identity of the device 55C and the unique preexisting identifier of the application 16 into the session table 26 having session context entries 54 of protocol specific identifiers, as depicted at step 230. If an instant messaging protocol is employed by the user device 34, then the session table 26 stores session identifiers available in the instant messaging protocol. Accordingly, at step 231 the protocol specific identifiers are specified according to the instant messaging protocol and further include at least one of user ID, buddy ID, screen name, aim ID and nickname. The instant messaging protocol, as the text messaging protocol, associates a session context 54 identifier 55A with corresponding identifiers deterministic of the user identity 55C and the application 16 identity to generate an emulated port ID applicable to an application 16 executing in a session oriented voice infrastructure.

At step 232, the session manager receives the return message 42 from the application 16 and references a session ID operable to index a particular session context entry including at least one protocol specific identifier of the user device and indicative of the session context. The session ID was computed in response to the first message to the application and operable to identify the corresponding return message from the application. Control then reverts to step 220 for successive messages 70, 72 as described above.

If the check at step 219 indicates an email session, then at step 240, mapping the successive messages includes mapping successive messages 70, 72 from the device 34 to the same application 16 by indexing the identity of the device 34 and the unique preexisting identifier of the application 16 into the session table 26 having session context entries 54 of user email addresses and application short codes 55C. Therefore, the user email address, rather than the user device telephone number, identifies the user.

At step 241, the session manager receives the return message from the application 16 and references a session ID operable to index a particular session context entry including the email address of the user device and indicative of the session context. The session ID was computed in response to the first message to the application and operable to identify the corresponding return message from the application. Control then reverts to step 220 for successive messages as described above.

It will be apparent to those of skill in the art that alternate identifiers and data items are employable for session context 54 identification. Other arrangements for identifying a series of request 70 and response 72 messages between two endpoints according to a particular infrastructure may be envisioned without departing from the spirit and scope of the methods claimed herein. Alternate configurations may also apply other rules and assumptions for maintaining uniqueness between session contexts applicable to multiple user devices 34 and multiple applications 16. The above described implementations are intended as exemplary and in no way are intended to limit the methods and computer system described.

In particular, the session context identifies each message such that the recipient, either the wireless device or the application, identifies previous messages in the same context to allow each recipient to process a message in light of other messages in the session context. The system identifies the session context via a session ID, discussed herein in particular implementations as at least one of a port ID, an emulated port ID, an application specific identifier, a session context ID, a source and a destination.

In particular implementations, the session ID is computed based on a variety of parameters. For example, in the email implementation, the session ID is operable to index a particular session context entry including the email address of the user device and indicative of the session context, computed in response to the first message to the application for identifying the corresponding return message from the application. Similarly, the instant messaging implementation includes a session ID to index a particular session context entry including at least one protocol specific identifier of the user device. Other implementations maybe envisioned including referencing a session ID operable to index a particular session context entry indicative of the session context, in which the session ID is computed in response to a message to the application for identifying the corresponding return message from the application. Such exemplary implementations include, but are not limited to, legacy paging systems, newer text messaging systems, such as Enhanced Messaging Service (EMS), Multimedia Messaging Service (MMS), and voice messaging employing analog audible signals, encoded appropriately. Other implementations and underlying transport protocols may be envisioned without departing from the spirit and scope of the claimed invention.

Those skilled in the art should readily appreciate that the programs and methods for context specific application support for an interactive user device in an information transport infrastructure defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for context specific application support for an interactive user device in an information transport infrastructure has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of controlling an application comprising:
receiving, from a device, a first message via a non-session based, stateless messaging protocol;
providing a session context based on the identity of the user device;
maintaining the session context that maps messages transferred from the device using the non-session based, stateless protocol to a session-based application controlled using a session-based protocol;
mapping the first message from the device using the non-session based, stateless messaging protocol to the session-based protocol using the maintained session context to allow the device to control the session-based application;
identifying the session context between the session-based application and the device, the session context operative to enable a stateful exchange between the session-based application and the user device, identifying further comprising indexing an identity of the device and a preexisting identity of the application in a session table; and
mapping a second message received from the application using the session-based protocol from the session-based application to the non-session based, stateless protocol using the maintained session context to return at least a portion of the second message to the device, further including employing the session context for maintaining the sequence of messages between the device and the application.

2. The method of claim 1 wherein the first message corresponds to the session-based application and is indicative of a request to invoke the session-based application.

3. The method of claim 1 further comprising employing the maintained session context for successive messages between the device and the application.

4. The method of claim 1 wherein mapping the first message further comprises routing, based on the identified session context, at least a portion of the message to the application, the routing operative to receive and direct user input destined for the application.

5. The method of claim 4 further comprising processing a script corresponding to the identified session context to receive and direct a portion of the message to the application.

6. The method of claim 5 wherein routing is operable to preserve the session context by maintaining the sequence of messages between the device and the application.

7. The method of claim 1 wherein the session context is maintained based on an identity of the device and an identity of the application.

8. A method for providing context specific application support for an interactive user device in an information transport infrastructure comprising:
receiving a non-session based, stateless message from a user via a user device, the message corresponding to a session-based application;
identifying a session context between the application and the user device, the session context based on an identity of the user device and an identity of the application, the session context operative to enable a stateful exchange between the session-based application and the user device, identifying further comprising indexing an identity of the device and a preexisting identity of the application in a session table;

processing the message by the corresponding application according to the identified session context; and mapping successive messages between the user device and the application by indexing the user device identity and application identity to preserve the session context by maintaining the order of messages between the user device and the application.

9. The method of claim 8 further comprising:

establishing the session context via the received message, the received message indicative of the application to establish the session context between a text messaging user device and the application; and invoking the application, the application responsive to the session context and operative to send and receive messages corresponding to the established session context.

10. The method of claim 9 wherein establishing the session context further comprises:

receiving a unique preexisting identifier corresponding to the application;

creating a session context entry in a session table based on the identity of the user device and the unique preexisting identifier; and referencing, via the unique preexisting identifier, the corresponding application.

11. The method of claim 10 wherein mapping the successive messages includes mapping successive messages from the device to the same application by indexing the identity of the user device and the unique preexisting identifier of the application into a session table having session context entries of wireless telephone numbers and application short codes.

12. The method of claim 11 wherein mapping the successive messages further comprises processing a script corresponding to the identified session context to receive and direct the message to the application.

13. The method of claim 11 wherein mapping the successive messages further comprises emulating a connection ID in the interactive voice response infrastructure by associating the session context with an emulated port ID via the session table.

14. The method of claim 8 wherein the session context is operable to maintain state information by referencing and maintaining a connection of the application in a stateful interactive voice response infrastructure to the user device by maintaining the order and sequence of messages sent between the application and the user device.

15. The method of claim 9 wherein establishing the session context further comprises:

receiving a short code corresponding to the application;

creating a session context entry in a session table based on the identity of the user device and the short code; and referencing, via the short code, a script operative to invoke the application.

16. The method of claim 15 wherein the message is a text message including the short code for invoking the application, the short code being a unique preexisting identifier within the infrastructure operative to reference and invoke a particular application for an interactive text messaging user.

17. The method of claim 10 wherein the unique preexisting identifier in the message further comprises a short code and application specific data, the application specific data encapsulated in an application specific data field following a short code field.

18. The method of claim 10 wherein mapping the successive messages includes mapping successive messages from the user device to the same application by indexing the identity of the device and the unique preexisting identifier of the application into a session table having session context entries of protocol specific identifiers.

19. The method of claim 18 wherein the protocol specific identifiers are further operative to identify a user and are specified according to an instant messaging protocol and further include at least one of user ID, buddy ID, screen name, AIM ID and nickname.

20. The method of claim 10 wherein mapping the successive messages includes mapping successive messages from the device to the same application by indexing the identity of the device and the unique preexisting identifier of the application into a session table having session context entries including at least one user email addresses, email addresses indicative of applications and application short codes.

21. The method of claim 20 further comprising referencing a session ID operable to index a particular session context entry including the email address of the user device and indicative of the session context, the session ID computed in response to a message to the application and operable to identify the corresponding return message from the application.

22. The method of claim 18 further comprising referencing a session ID operable to index a particular session context entry including at least one protocol specific identifier of the user device and indicative of the session context, the session ID computed in response to a message to the application and operable to identify the corresponding return message from the application.

23. The method of claim 8 further comprising referencing a session ID operable to index a particular session context entry indicative of the session context, the session ID computed in response to a message to the application and operable to identify the corresponding return message from the application.

24. The method of claim 8 wherein the information transport infrastructure is an interactive voice response infrastructure and establishing further comprises adapting speech responsive components for text message operability.

25. The method of claim 24 wherein the mapping between the application and the user device occurs via a text to speech interconnection component and an automatic speech recognition interconnection component, the interconnection components operable to integrate text message data to interfaces in the preexisting information transport infrastructure.

26. The method of claim 8 wherein the session context terminates after expiration of a reasonable predetermined timeout by the session manager.

27. A method for providing context specific application support for an interactive text messaging user on an interactive voice response infrastructure comprising:

receiving an informational item from a user via a user device, the informational item corresponding to a particular session-based application;

identifying, via a session manager, a session context between the application and the user, the session context based on the identity of the user device and the identity of the application, the session context operative to enable a stateful exchange between the session-based application and the user device, identifying further comprising indexing an identity of the device and a preexisting identity of the application in a session table;

processing, via a script processor, a script corresponding to the identified session context, the script processor operative to receive and direct user input destined for the application; and mapping, via the session manager, successive communications between the user device and the application by indexing the user device identity and application identity to preserve the session context by maintaining the order and sequence of informational items between the user and the application.

28. A telecommunications device for remotely controlling an application from a user device comprising:

a message server operative to receive a first message from a device via a non-session based, stateless messaging protocol and to provide a session context based on the identity of the user device;

a session table operative for storing and maintaining a session context entry that enables mapping of messages transferred from the device using the non-session based, stateless protocol to a session-based application controlled using a session-based protocol, the session context operative to enable a stateful exchange between the session-based application and the user device;

a session manager having the session table, the session table responsive to the session manager for mapping the first message from the device, using the non-session based, stateless messaging protocol, to the session-based protocol using the stored session context, to allow the device to control the session-based application, mapping further comprising indexing an identity of the device and a preexisting identity of the application in a session table; the stored session context for maintaining the sequence of messages between the device and the application;

the session manager further operable to map a second message, received from the application, using the session-based protocol, from the session-based application to the non-session, stateless based protocol using the maintained session context, to return at least a portion of the second message to the device.

29. The telecommunications device of claim 28 wherein the first message corresponds to the session-based application and is indicative of a request to invoke the session-based application.

30. The telecommunications device of claim 28 wherein the session manager is further operable to employ the maintained session context in the session table for successive messages between the device and the application.

31. The telecommunications device of claim 28 wherein the session context table is operable to identify the session context between the session-based application and the device, the session context operative to enable a stateful exchange between the session-based application and the device.

32. The telecommunications device of claim 31 wherein the session manager is operative to map the first message by routing, based on the identified session context, at least a portion of the message to the application, the routing operative to receive and direct user input destined for the application.

33. The telecommunications device of claim 32 wherein the session manager is operative to invoke an application dispatch process, the application dispatch process operable for processing an executable entity corresponding to the identified session context to receive and direct a portion of the message to the application.

34. The telecommunications device of claim 33 wherein the session manager is operative to preserve the session context by maintaining the sequence of messages between the device and the application.

35. The telecommunications device of claim 28 wherein the session manager is operative to maintain the session context based on an identity of the device and an identity of the application.

36. A method for invoking and using a speech based application on an existing speech processing infrastructure using a text messaging enabled device comprising:

defining a set of short codes indicative of local applications;

intercepting a short code at an interactive message manager corresponding to a particular local application establishing a session context between the user device issuing the short code and the corresponding application based on an identity of the user device;

transmitting, within the established session context, an informational item indicative of the invocation of the particular local application to the speech interpreter;

receiving the invocation request at a scripting component, the scripting component operable to map incoming calls to the local applications via application specific scripts while maintaining the session context;

identifying the session context between the local application and the device, the session context operative to enable a stateful exchange between the session-based application and the user device, identifying further comprising indexing the identity of the device and a preexisting identity of the application in a session table;

mapping the invocation request to the corresponding application;

receiving a response from the particular local application triggered by the invocation;

mapping the response back to the invoking user device via a session table operative to maintain context between the user device and the particular application;

receiving further informational items via a non-session based, stateless messaging protocol from the user device to the same invoked application;

maintaining the context by mapping successive informational items between the user device and the particular application via the session table; and employing the session context for maintaining the sequence of messages between the user device and the local application.

37. A computer program product having a computer readable medium operable to store computer program logic embodied in computer program code encoded thereon for providing context specific application support for an interactive user device in an information transport infrastructure comprising:

computer program code for receiving a non-session based, stateless message from a user via a user device, the message corresponding to an application;

computer program code for identifying a session context between the application and the user device, the session context based on an identity of the user device and an identity of the application, the session context operative to enable a stateful exchange between the session-based application and the user device, identifying further comprising indexing an identity of the device and a preexisting identity of the application in a session table;

computer program code for processing the message by the corresponding application according to the identified session context; and computer program code for mapping successive messages between the user device and the application by indexing the user device identity and application identity to preserve the session context by maintaining the order of messages between the user device and the application, further including employing the session context for maintaining the sequence of messages between the device and the application.

38. A telecommunications device for remotely controlling an application from a user telecommunications device comprising:

means for receiving a non-session based, stateless message from a user via a user device, the message corresponding to an application;

means for identifying a session context between the application and the user device, the session context based on an identity of the user device and an identity of the application, identifying further comprising indexing an identity of the user device and a preexisting identity of the application in a session table, the session context operative to enable a stateful exchange between the session-based application and the user device;

means for processing the message by the corresponding application according to the identified session context; and means for mapping successive messages between the user device and the application by indexing the user device identity and application identity to preserve the session context by maintaining the order of messages between the user device and the application.

39. The method of claim 1 further comprising receiving a unique preexisting identifier corresponding to the application, wherein the unique preexisting identifier in the message further comprises a short code and application specific data, the application specific data encapsulated in an application specific data field following a short code field.

40. The method of claim 1 where the non-session based, stateless messaging protocol is an SMS protocol and the message is a text message.

* * * * *